US008468236B2

(12) United States Patent
Nesse et al.

(10) Patent No.: US 8,468,236 B2
(45) Date of Patent: Jun. 18, 2013

(54) SYSTEMS AND METHODS FOR PROVIDING FREQUENCY DIVERSITY IN SECURITY TRANSMITTERS

(75) Inventors: Ted Nesse, Stillwater, MN (US); John Bergman, River Falls, WI (US); Paul Saldin, Stillwater, MN (US)

(73) Assignee: Sercomm Corporation, Taipei (TW)

( * ) Notice: Subject to any disclaimer, the term of this patent is extended or adjusted under 35 U.S.C. 154(b) by 1072 days.

(21) Appl. No.: 11/945,607

(22) Filed: Nov. 27, 2007

(65) Prior Publication Data
US 2010/0049799 A1    Feb. 25, 2010

(51) Int. Cl.
*G06F 15/173*    (2006.01)
(52) U.S. Cl.
USPC ........................................... 709/224
(58) Field of Classification Search
USPC ........................................... 709/224
See application file for complete search history.

(56) References Cited

U.S. PATENT DOCUMENTS

| | | | |
|---|---|---|---|
| 3,870,959 A | | 3/1975 | Wootton |
| 4,462,022 A | * | 7/1984 | Stolarczyk ............... 340/506 |
| 5,549,113 A | | 8/1996 | Halleck et al. |
| 5,958,011 A | * | 9/1999 | Arimilli et al. ............. 709/224 |
| 5,983,112 A | * | 11/1999 | Kay ............... 455/504 |
| 6,188,447 B1 | | 2/2001 | Rudolph et al. |
| 6,339,585 B1 | * | 1/2002 | Hulyalkar et al. ........... 370/226 |
| 6,384,710 B1 | | 5/2002 | LeMense et al. |
| 6,993,660 B1 | * | 1/2006 | Libenzi et al. ............... 713/188 |
| 7,299,068 B1 | | 11/2007 | Halla et al. |
| 7,606,255 B2 | * | 10/2009 | Smith ........................ 370/432 |
| 7,616,568 B2 | * | 11/2009 | Olderdissen et al. ......... 370/231 |
| 8,122,134 B2 | * | 2/2012 | Proctor et al. ............... 709/228 |
| 2004/0095227 A1 | * | 5/2004 | Lehman .................... 340/425.5 |
| 2006/0109078 A1 | | 5/2006 | Keller, Jr. et al. |
| 2007/0110181 A1 | | 5/2007 | Eskildsen |

FOREIGN PATENT DOCUMENTS

WO    WO 00/11806 A1    3/2000

OTHER PUBLICATIONS

International Search Report of PCT/US2008/082344, dated Mar. 18, 2009.
Written Opinion of the International Searching Authority of PCT/US2008/082344, dated Mar. 18, 2009.

* cited by examiner

*Primary Examiner* — Brian P Whipple
(74) *Attorney, Agent, or Firm* — Hamre, Schumann, Mueller & Larson, P.C.

(57) ABSTRACT

A system for transmitting and receiving communication messages in a wireless security system is provided. The security system comprises one or more security sensor devices and a receiving device. Each security sensor device is capable of monitoring a status change in an area and is capable of generating and transmitting a communication message at a first frequency and a communication message at a second frequency based on a change in status of the area being monitored. The receiving device capable of receiving the communication messages from the one or more security sensor devices and in response thereto is capable of generating one or more instruction signals based on the communication messages. A security sensor device of the one or more security sensor devices transmits the communication message at least one time at the first frequency and the communication message at least one time at the second frequency.

15 Claims, 4 Drawing Sheets

SYSTEMS AND METHODS FOR PROVIDING FREQUENCY DIVERSITY IN SECURITY TRANSMITTERS

FIELD

This disclosure relates generally to the field of security systems. More particularly, the disclosure relates to systems and methods for transmitting and receiving communication messages between one or more security sensor devices and a receiving device.

BACKGROUND

Wireless communication between one or more security sensors and a receiving device in a security system is known. Typically, when one of the one or more security sensors is required to transmit a communication message to a receiving device, such as a main controller, for example, during a status change of the security sensor, a transmitter housed within the security sensor will transmit the communication message at a preset frequency known by the one or more security sensors and the main controller. However, in many locations where a security system would be installed, there are often multiple surfaces (i.e., walls, floors, ceilings, furniture, etc.) that cause reflection of the wirelessly transmitted signals and alter the path of the signals to the main controller. In some cases, multiple reflections of the signal can cause interference or cancellation of the transmitted signal preventing the signal from reaching the main controller. Moreover, the main controller may be located in a null area of low signal strength for the frequency being used. Thus, signals sent to a main controller well within the transmission range of the security sensor may not reach the main controller.

The security sensors usually include battery operated radio frequency ("RF") transmitters that use one-way low power signaling and operate in the industrial, scientific and medical ("ISM") radio band. Because these transmitters are typically low power devices, they can operate as unlicensed transmitters in the ISM band. However, in recent years, high power military applications have been developed using signals within the ISM band that interfere with signals transmitted by security sensors using the same RF frequency. Thus, security systems that enable reliable communication between the security sensors and the receiving device have become a pressing need.

For the reasons stated above, and for other reasons stated below that will become apparent to those skilled in the art upon reading and understanding the present specification, there is a need in the art for improved systems and methods of transmitting and receiving communication messages between one or more security sensor devices and a receiving device. This system and method would allow communication messages to be sent via one or more security sensor devices to a receiving device in a reliable and cost-effective manner.

SUMMARY

This disclosure relates to improved methods and systems for transmitting and receiving communication messages between one or more security sensor devices and a receiving device. In particular, systems and methods for transmitting and receiving communication messages in a wireless security system, whereby the communication message is sent at least one time and at more than one frequency.

In one embodiment, a system for transmitting and receiving communication messages in a wireless security system is provided. The security system comprises one or more security sensor devices and a receiving device. Each security sensor device is capable of monitoring a status change in an area and is capable of generating and transmitting a communication message at a first frequency and a communication message at a second frequency based on a change in status of the area being monitored. The receiving device capable of receiving the communication messages from the one or more security sensor devices and in response thereto is capable of generating one or more instruction signals based on the communication messages. A security sensor device of the one or more security sensor devices transmits the communication message at least one time at the first frequency and the communication message at least one time at the second frequency.

In another embodiment, a security sensor device usable in a wireless security system is provided. The security sensor device comprises a sensor that can generate a status signal, a microcontroller and a multiple frequency transmitter. The microcontroller is coupled to the sensor device that can generate a communication message to be sent at a first frequency and a communication message to be sent at a second frequency. The multiple frequency transmitter is coupled to the microcontroller that can send the communication message at the first frequency and the communication message at the second frequency.

In another embodiment, a receiving device usable in a wireless security system is provided. The receiving device comprises a receiver module and a controller module. The receiver module monitors for a communication message at a first frequency and monitors for a communication message at a second frequency. The controller module is coupled to the receiver module and having a system controller for generating one or more instruction signals after processing a received communication message.

In another embodiment, a method of transmitting communication messages by a security sensor device in a wireless security system is provided. The method comprises providing a security sensor device having a sensor capable of generating a status signal, a microcontroller coupled to the sensor and capable of generating a communication message for transmission at a first frequency and a communication message for transmission at a second frequency, and a multiple frequency transmitter coupled to the microcontroller that can transmit the communication message at the first frequency and the communication message at the second frequency. The method also comprises monitoring an area to be secured for a status change with the sensor and generating the communication message for transmission at the first frequency and the communication message for transmission at the second frequency based on the status change with the microcontroller. The method further comprises transmitting the communication message at the first frequency and the communication message at the second frequency with the multiple frequency transmitter.

In yet another embodiment, a method of receiving communication messages by a receiving device in a wireless security system is provided. The method comprises providing a receiving device having a receiver module capable of receiving a communication message transmitted at a first frequency and a communication message transmitted at a second frequency, and a controller module coupled to the receiver module and having a system controller for generating one or more instruction signals. The method also comprises receiving the communication message at the first frequency or at the second frequency and validating the received communication message with the receiver module. The method further comprises processing the received communication message with the controller module and creating and sending one or more instruction signals based on the received communication message.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized and that logical, mechanical and electrical changes may be made without departing from the spirit and scope of the claims. The following detailed description is, therefore, not to be taken in a limiting sense.

Embodiments presented herein involve systems and methods for transmitting communication messages between one or more security sensors and a receiving device of a security system. Advantageously, these embodiments provide reliable communication between a security sensor and a receiving device by bypassing any signal interference and null areas. In the embodiments described below, the receiving device is described as a main controller. However, in other embodiments, the receiving device can be another device including one with a transmitter function, for example a security sensor device.

Figure 1:
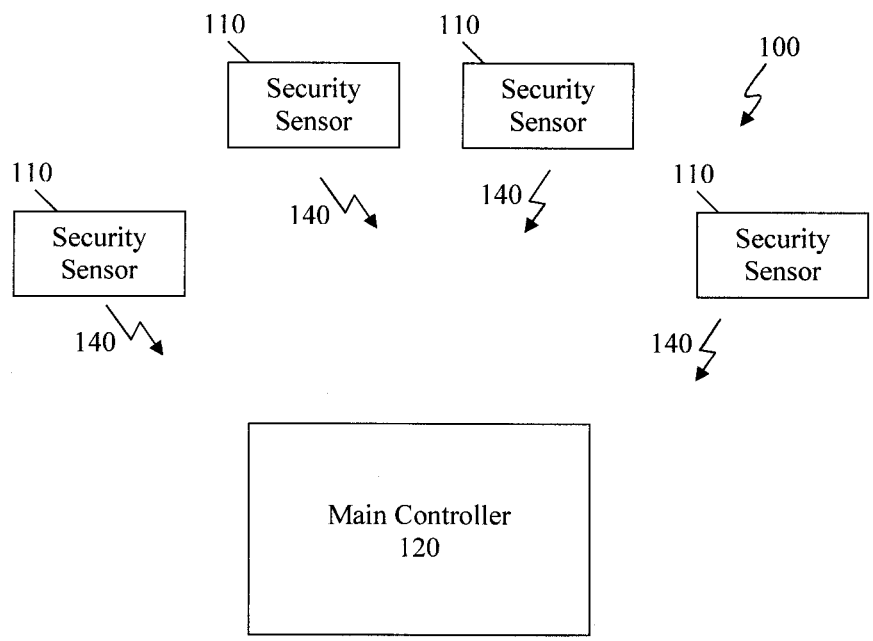
FIG. 1 is a block diagram of a wireless security system according to one embodiment.

FIG. 1 is a block diagram of a wireless security system according to one embodiment of the present invention. Wireless security system 100 comprises one or more wireless security sensor devices 110 used for monitoring an area and a main controller 120. Each wireless security sensor device 110 can include one or more of the following exemplary devices: a door/window sensor that detects when a portal is opened; a motion detector that detects movement within a space; a smoke detector that detects smoke within an area; a heat detector that detects excessive heat within an area; a low temperature detector that detects a potentially hazardous temperature within an area; a glassbreak detector which detects a breakage of glass. The security sensor device 120 can also be a device initiated by a user, for example a key fob that allows the user to initiate a communication message by pressing a button on the keyfob. However, it would be obvious for one skilled in the art to include other types of security sensors that detect, sense or allow a user to initiate a change in the status of a portion of the area being monitored. The wireless security sensor devices 110 are capable of transmitting communication messages 140 to main controller 120 at two or more frequencies. Also, the main controller 120 is enabled to receive and process communication messages sent over two or more frequencies.

Figure 2:
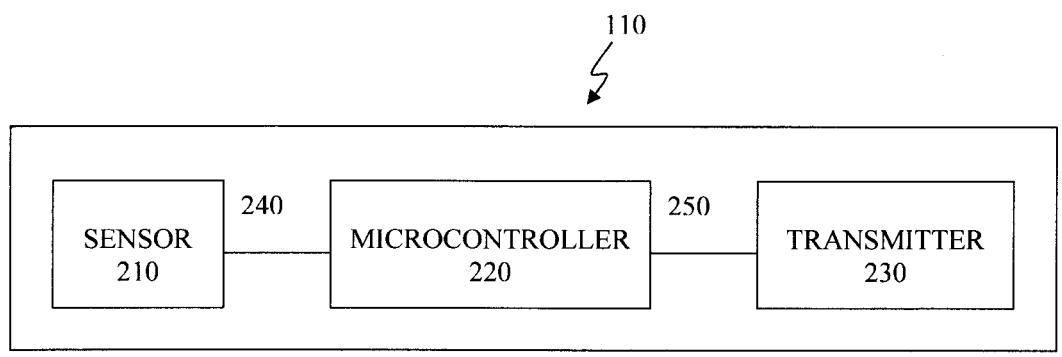
FIG. 2 is a block diagram of a wireless security sensor according to one embodiment.

FIG. 2 is a block diagram of a wireless security sensor device 110. The wireless security sensor device 110 includes a sensor 210 coupled to a microcontroller 220 via connection 240. The microcontroller 220 is also coupled to a multiple frequency transmitter 230 via connection 250. The multiple frequency transmitter 230 is capable of wirelessly transmitting a communication message across multiple frequencies. In operation, the sensor 210 creates a status signal when it senses or detects a change in the status of a portion of the area being monitored. The status signal is sent to the microcontroller 220 via connection 240. The microcontroller 220 retrieves the status signal and creates a communication message to notify a main controller, such as the main controller 120 shown in FIG. 1. In one embodiment, the communication message created by the microcontroller 220 is an 80 bit encrypted message. However, it would be obvious to one skilled in the art that in other embodiments the communication message is not 80 bits or not encrypted. The communication message is sent to the transmitter 230 via connection 250. Transmitter 230 wirelessly transmits the communication message for retrieval by a system controller.

Figure 3:
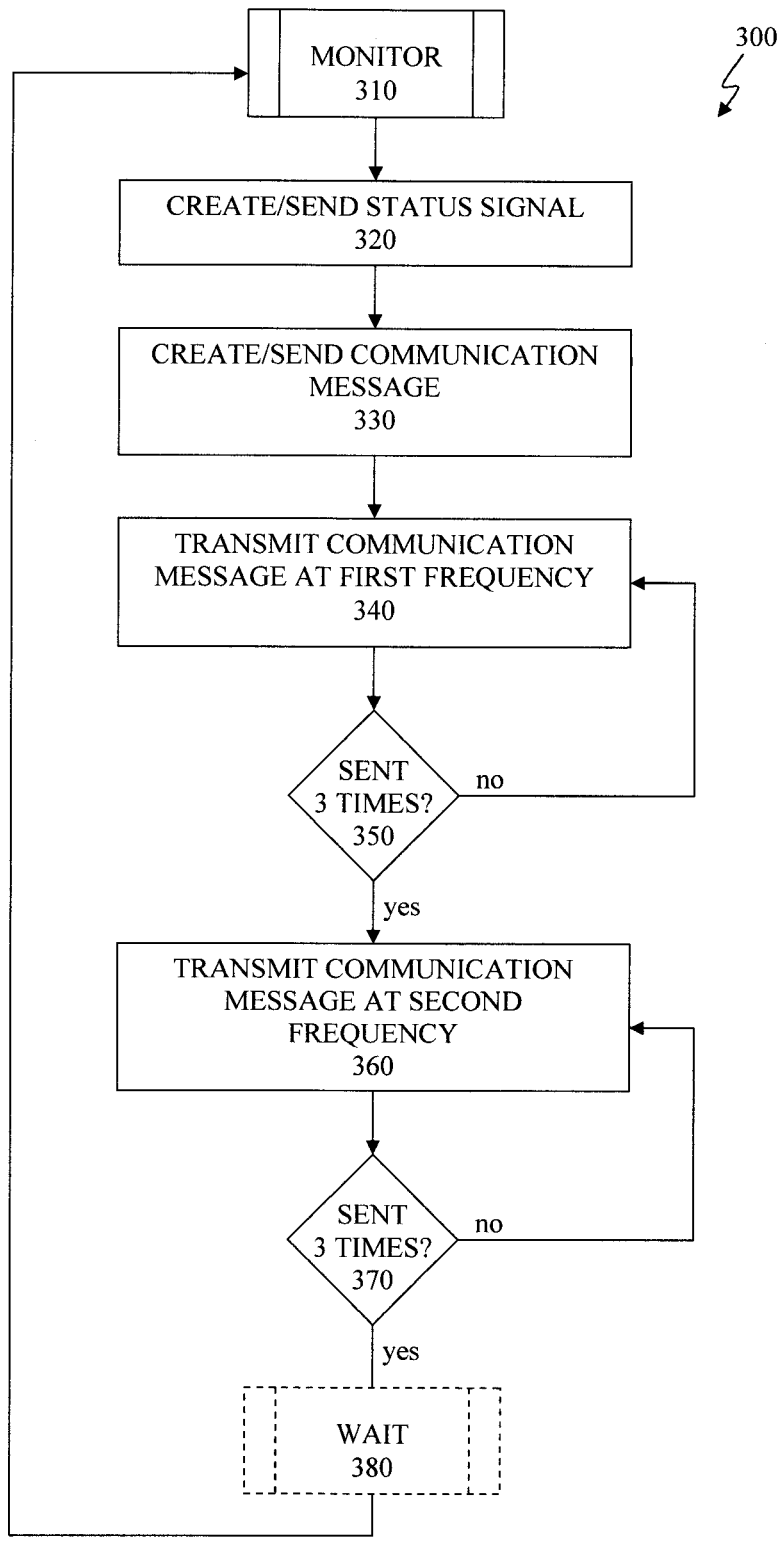
FIG. 3 is a simplified high-level flow chart of a method for transmitting a communication message using the wireless security sensor.

FIG. 3 is a simplified high-level flow chart of a method for transmitting a communication message using the wireless security sensor device 110. Flowchart 300 depicted in FIG. 3 is merely illustrative of one embodiment and other variations, modifications and alternatives could be made by one of ordinary skill in the art. At step 310, sensor 210 monitors a portion of the area being secured until a change of status occurs. Once the sensor 210 detects or senses a status change, the flowchart 300 proceeds to step 320. At step 320, the sensor 210 creates a status signal and sends the status signal to the microcontroller 220 via connection 240. The flowchart 300 then proceeds to step 330.

At step 330, the microcontroller 220 receives the status signal and creates a communication message and sends the communication message to the transmitter 230 via connection 250. The flowchart 300 then proceeds to step 340. At step 340, the transmitter 230 transmits the communication message wirelessly at a first frequency and then flowchart 300 proceeds to step 350. For example, in one embodiment, the first frequency is set to 319.5 MHz. At step 350, the microcontroller 220 determines whether the communication message has been transmitted a predetermined number of times at the first frequency. For example, in one embodiment, the microcontroller 220 determines whether the communication message has been transmitted three times at the first frequency. If the microcontroller 220 determines that the communication message has not been sent the predetermined number of times at the first frequency, flowchart 300 proceeds back to step 340. If the microcontroller 220 determines that the communication message has been sent the predetermined number of times at the first frequency, flowchart 300 proceeds to step 360.

At step 360, the transmitter 230 is set to a second frequency and transmits the communication message wirelessly at the second frequency. For example, in one embodiment, the second frequency is set to 345 MHz. The flowchart 300 then proceeds to step 370. At step 370, the microcontroller 220 determines whether the communication message has been transmitted a predetermined number of times at the second frequency. For example, in one embodiment, the microcontroller 220 determines whether the communication message has been transmitted three times at the second frequency. If the microcontroller 220 determines that the communication message has not been sent the predetermined number of times at the second frequency, flowchart 300 proceeds back to step 360. If the microcontroller 220 determines that the communication message has been sent the predetermined number of times at the second frequency, the flowchart 300 proceeds back to step 310.

In some embodiments, such as when the sensor device 110 is a motion detector, if the microcontroller 220 determines that the communication message has been sent the predetermined number of times at the second frequency, the flowchart 300 proceeds to step 380. At step 380, the microcontroller 220 waits until no status signal is received from the sensor 210 via connection 240 for a set period of time. In one embodiment, the set period of time in which no status signal is received from the sensor 210 via connection 240 is three minutes. However, it would be obvious for one skilled in the art to either increase or decrease the amount of wait time by the microcontroller 220 as desired. After the microcontroller has not received a status signal from the sensor via connection 240 for the set period of time, the flowchart 300 then proceeds back to step 310.

In another embodiment, the transmitter 230 alternates transmissions between the two predefined frequencies. For example, the transmitter 230 can transmit the communication message a set number of times whereby every odd transmission is sent at the first set frequency, and every even transmission is sent at the second set frequency.

An advantage of the method provided by the flowchart 300 is that even if transmissions of the communication message are not received by a main controller due to interference at one frequency that same interference is not likely to have an impact on the communication messages transmitted at the second frequency. Thus, there is an increased likelihood that a main controller will receive at least one of the communication messages sent by the wireless security sensor device 110.

Figure 4:
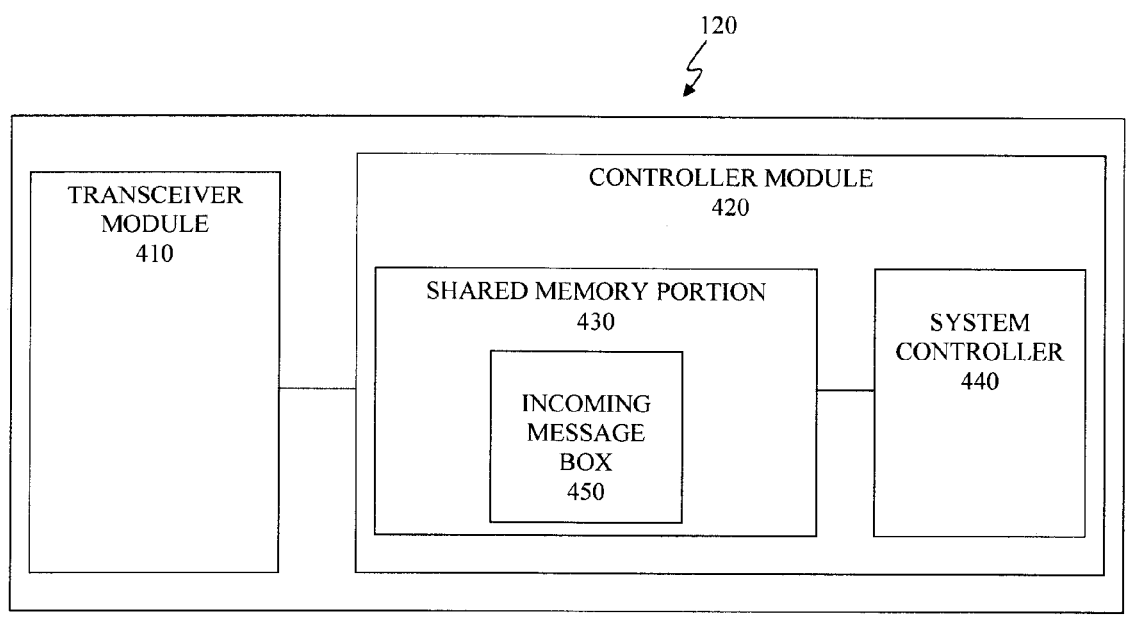
FIG. 4 is a block diagram of a receiving device according to one embodiment.

FIG. 4 is a block diagram of the main controller 120 according to one embodiment. The main controller 120 includes a transceiver module 410 that is capable of transmitting and receiving communication messages and is coupled to a controller module 420. In some embodiments, the main controller 120 may use a receiver module instead of the transceiver module 410 if the main controller 120 is not required to wirelessly transmit data but only wirelessly receive data. Within controller module 420 is a shared memory portion 430 and a system controller portion 440. The shared memory portion 430 consists of an incoming message box 450. The incoming message box 450 is capable of storing a plurality of distinct communication messages sent from a wireless security sensor and received by the transceiver 410. In one embodiment, as shown in Table 1 below, the incoming message box 450 is capable of storing 8 different communication messages received by the transceiver 410. Both the transceiver module 410 and the system controller portion 440 have access to the shared memory portion 430, with the transceiver module 410 exercising primary control over the shared memory portion 430 and the system controller portion 440 having secondary control. In some embodiments the controller module 420 does not have a shared memory portion 430, but is connected to a memory portion with an incoming message box 450. In these embodiments, the transceiver module 410 and the system controller 440 are connected to the memory portion, for example, via a parallel I/O port or a serial port connection. Table 1, shown below is one embodiment of a memory map of the incoming message box 450. This table provides an overall organization of the incoming message box 450 used for storing communication messages received by the transceiver 410.

TABLE 1

| Size (bytes) | Definition |
| --- | --- |
| 10 | Incoming Message Box 0 |
| 10 | Incoming Message Box 1 |
| 10 | Incoming Message Box 2 |
| 10 | Incoming Message Box 3 |
| 10 | Incoming Message Box 4 |
| 10 | Incoming Message Box 5 |
| 10 | Incoming Message Box 6 |
| 10 | Incoming Message Box 7 |
| 1 | Firmware Version Information (Exclusively controlled by the Transceiver 410 during startup of the wireless communication system) |
| 1 | Next Incoming Message Location (Incoming Message Box 0-7) |
| 2 | Open - Available for system controller 440 to setup buffer overrun detection |

Figure 5:
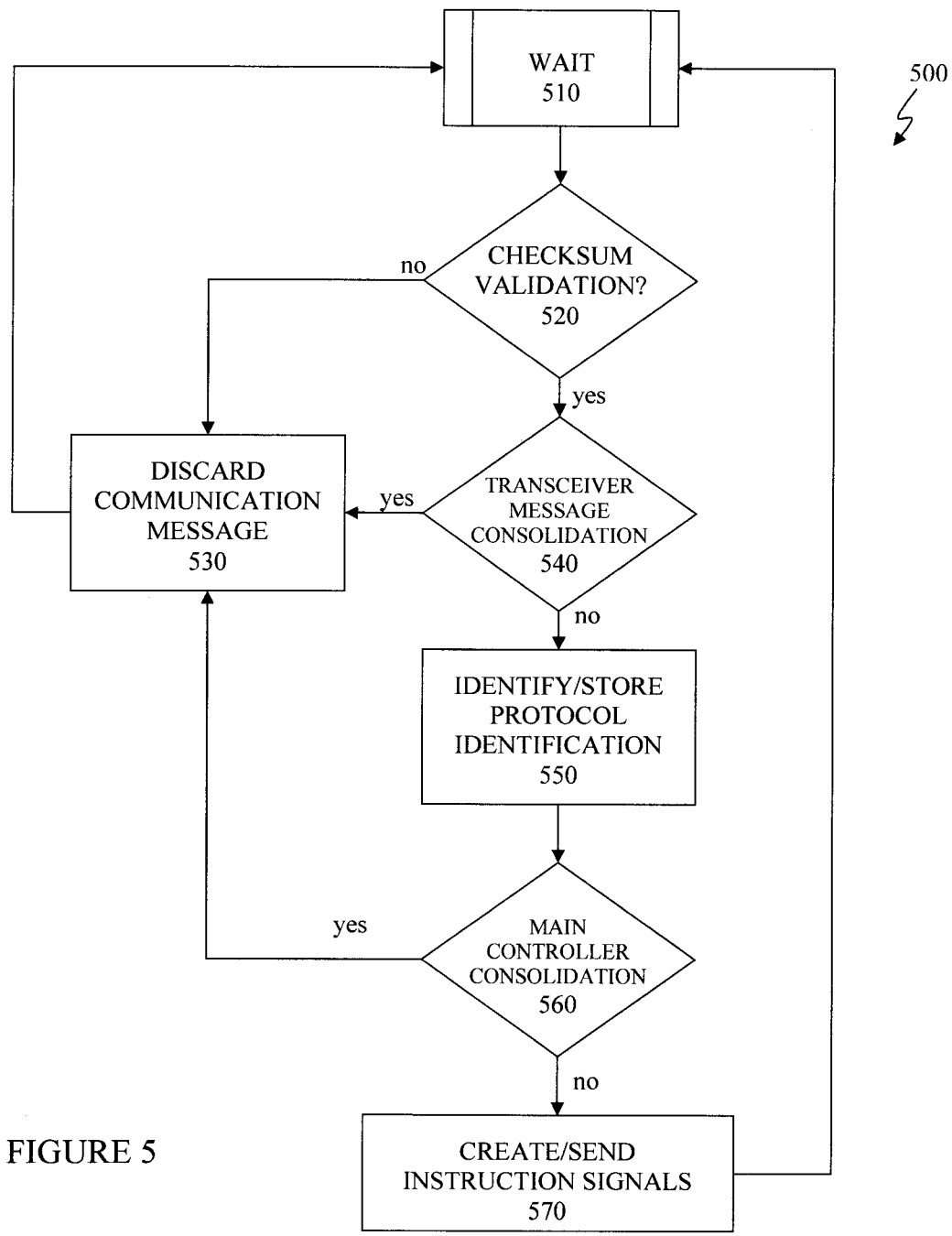
FIG. 5 is a simplified high-level flow chart of a method for receiving a communication message using the system controller.

FIG. 5 is a simplified high-level flow chart of a method for receiving a communication message using the system controller 120. Flowchart 500 depicted in FIG. 5 is merely illustrative of one embodiment and other variations, modifications and alternatives could be made by one of ordinary skill in the art. At step 510, transceiver 410 monitors incoming transmissions sent by a wireless security sensor over multiple frequencies. In one embodiment, the transceiver 410 monitors transmissions over two frequencies, for example at 319.5 MHz and at 345 MHz. In some embodiments, the transceiver 410 alternates monitoring time between the multiple frequencies until the start of a new message, for example the preamble, is detected. Once the start of a new message is detected, the transceiver 410 stays on the frequency of the detected new message until the complete new message is received. Once the complete new message is received, the transceiver returns to monitoring incoming transmissions by alternating between the multiple frequencies. The flowchart 500 proceeds to step 520 once a complete communication message is received by transceiver 410.

At step 520, the transceiver 410 performs the first of several preprocessing procedures on the received communication message. The first preprocessing procedure performed by the transceiver 410 is a checksum validation to determine whether the communication message received by the transceiver 410 is using a recognized protocol, by checking both the format and size of the communication message, required by the system controller 440 to process the communication message. In one embodiment, the system controller 440 is capable of processing a variety of different message protocols and accordingly the transceiver 410 performs a checksum validation that will validate any of these different message protocols. If the communication message received by the transceiver 410 provides an invalid checksum, then the flowchart 500 proceeds to step 530. At step 530, the communication message is discarded and the flowchart proceeds back to step 510. If the communication message received by the transceiver 410 provides a valid checksum, then the flowchart 500 proceeds to step 540.

At step 540, the transceiver 410 performs another preprocessing procedure of message consolidation. The transceiver 410 compares the received communication message with the previous received communication message stored in the incoming message box 450. If the two communication messages are the same, then the flowchart 500 proceeds to step 530 and the received communication message is discarded. If the two communication messages are different, then the flowchart 500 proceeds to step 550. In this embodiment, the transceiver 410 does not identify a duplicate incoming communication message if the two duplicate communication messages are separated by one or more valid communication messages sent, for example, from another security sensor. However, in another embodiment, the transceiver 410 can compare the received communication message with every previously received communication message currently stored in the incoming message box 450.

At step 550, the transceiver 410 prepares a protocol identification by analyzing the incoming communication message, and stores the protocol identification with the communication message in the incoming message box 450. The flowchart 500 then proceeds to step 560. In some embodiments, steps 520 and 540 are bypassed and every incoming communication message is processed at step 560.

At step 560, the system controller 440 is permitted to process the communication message received by the transceiver 410 and stored in the incoming message box 450. This process includes parsing the communication message based on the protocol identification to obtain the status signal created by a wireless security transmitter, for example, the security sensor device 110 shown in FIG. 2, and determining whether the status signal indicates a changed state of the security sensor device 110. If the status signal does not indicate a changed state of the security sensor device 110, then the flowchart 500 proceeds back to step 530 and the communication message is discarded. If the status signal indicates a changed state, then the parsed communication message is not a duplicate message and the flowchart 500 proceeds to step 570. Thus, step 560 allows the main controller 120 to discard a duplicate communication message separated by the previously received communication message by one or more different valid communication messages that would not have been recognized by the transceiver 410 in step 540.

At step 570, the system controller 440 determines the appropriate action to be taken by the main controller 120 based on the status signal parsed out from the communication message. The system controller 440 then creates the necessary instruction signals to be sent to other components of the security system. The flowchart 500 then proceeds back to step 510. Using this method, the main controller 120 is capable of receiving communication messages sent over multiple frequencies, removing any duplicate communication messages and providing the appropriate instruction signals according to the status signal contained in the communication message.

What is claimed is:

1. A system for transmitting and receiving communication messages in a wireless security system, the system comprising:
   a plurality of security sensor devices, each security sensor device includes a sensor coupled to a multiple frequency transmitter, wherein the sensor is configured to monitor a status change in an area and the multiple frequency transmitter is configured to transmit a communication message at a first frequency and transmit the communication message at a second frequency based on a change in status of the area being monitored; and
   a receiving device that includes a receiver module coupled to a controller module, wherein the receiver module is configured to receive the communication message at the first frequency and the second frequency from one or more of the plurality of security sensor devices and in response thereto the controller module is configured to generate one or more instruction signals based on the communication message;
   wherein the multiple frequency transmitter for each of the plurality of security sensor devices is configured to transmit the communication message at least one time at the first frequency and transmit the same communication message at least one time at the second frequency.

2. The system of claim 1, wherein the receiving device receives the communication message and discards the received communication message if it is the same as a previously received communication message.

3. The system of claim 1, wherein the security sensor device transmits the communication message at the first frequency a plurality of times and transmits the communication message at the second frequency a plurality of times.

4. The system of claim 1, wherein each of the security sensor devices further comprises:
   a microcontroller coupled to the sensor and the multiple frequency transmitter, the microcontroller configured to generate the communication message based on the change in status of the area being monitored.

5. The system of claim 1, wherein the receiving device is a main controller, the receiving device further comprising:
   the controller module coupled to the receiver module and having a shared memory portion for storing received communication messages and a system controller.

6. The system of claim 1, wherein the receiver module is a transceiver.

7. A security sensor device for a wireless security system, the sensor device comprising:
   a sensor configured to generate a status signal when a change in status of an area being monitored is detected,
   a microcontroller coupled to the sensor device configured to generate a communication message based on the change in status of the area being monitored and detected by the sensor, and
   a multiple frequency transmitter coupled to the microcontroller configured to send the communication message at the first frequency and send the same communication message at the second frequency.

8. The security sensor device of claim 7, wherein the multiple frequency transmitter sends the communication message at the first frequency a plurality of times and sends the communication message at the second frequency a plurality of times.

9. A receiving device for a wireless security system, the receiving device comprising:
   a hardware receiver module configured to monitor for and receive a communication message at a first frequency and at a second frequency; and
   a controller module coupled to the receiver module, the controller module including a system controller and an incoming message box, the system controller configured to process the communication message received from the hardware receiver module and configured to generate one or more instruction signals after processing the communication message, and the incoming message box configured to store the communication message,
   wherein the system controller is configured to compare the communication message received by the hardware receiver module directly from a security sensor device with a previously received communication message received by the hardware receiver module directly from the security sensor device and is configured to discard the communication message if the communication message is the same as the previously received communication message.

10. The receiving device of claim 9, wherein the receiving device is a main controller.

11. The receiving device of claim 9, wherein the hardware receiver module is a transceiver that is capable of transmitting the one or more instruction signals.

12. The receiving device of claim 9, wherein the hardware receiver module is configured to perform a checksum validation of the communication message to determine whether the communication message is valid and is configured to discard the communication message if the communication message is determined to be invalid; and wherein the system controller is configured to discard the communication message if it is the same as the previously received communication message received prior to the communication message determined to be valid.

13. A method of transmitting communication messages by a security sensor device in a wireless security system, the method comprising:

providing a security sensor device having a sensor capable of generating a status signal based on a change in status of an area to be secured, a microcontroller coupled to the sensor, the microcontroller capable of generating a communication message based on the change in status of the area to be secured, and a multiple frequency transmitter coupled to the microcontroller capable of transmitting the communication message at a first frequency and at a second frequency;

monitoring the area to be secured for a status change with the sensor;

generating the communication message based on the status change with the microcontroller;

transmitting the communication message at the first frequency and the same communication message at the second frequency with the multiple frequency transmitter.

14. The method of claim 13, transmitting the communication message at the first frequency a plurality of times and transmitting the communication message at the second frequency a plurality of times.

15. A method of receiving communication messages by a receiving device in a wireless security system, the method comprising:

providing a receiving device having a receiver module capable of receiving a communication message transmitted at a first frequency and a communication message transmitted at a second frequency, and a controller module coupled to the receiver module and having a system controller for processing the communication message received from the receiver module and generating one or more instruction signals, receiving the communication message at the first frequency or at the second frequency;

validating the received communication message with the receiver module;

processing the received communication message with the controller module;

comparing the communication message received by the receiver module directly from a security sensor with a previously received communication message received by the receiver module directly from the security sensor;

discarding the communication message if the communication message is the same as a previously received communication message; and creating and sending one or more instruction signals based on the received communication message.

* * * * *